US011852082B2

(12) United States Patent
Frey et al.

(10) Patent No.: US 11,852,082 B2
(45) Date of Patent: Dec. 26, 2023

(54) SYSTEMS AND METHODS FOR CONTROLLING A FUEL BLEND FOR A GAS TURBINE

(71) Applicant: GENERAL ELECTRIC COMPANY, Schenectady, NY (US)

(72) Inventors: George F. Frey, Houston, TX (US); Jocelyn E. Passty, Huntersville, NC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/568,782

(22) Filed: Jan. 5, 2022

(65) Prior Publication Data

US 2023/0212990 A1 Jul. 6, 2023

(51) Int. Cl.
*F02C 9/40* (2006.01)
*F02C 9/28* (2006.01)
*F23R 3/36* (2006.01)

(52) U.S. Cl.
CPC .............. *F02C 9/28* (2013.01); *F02C 9/40* (2013.01); *F23R 3/36* (2013.01); *F05D 2220/32* (2013.01); *F05D 2270/0831* (2013.01)

(58) Field of Classification Search
CPC ............ F02C 9/40; F23N 2221/10; F23R 2900/00013
See application file for complete search history.

(56) References Cited

U.S. PATENT DOCUMENTS

| 6,460,341 | B1 | 10/2002 | Gutmark et al. |
| 7,484,369 | B2 | 2/2009 | Myhre |
| 7,775,052 | B2 | 8/2010 | Cornwell et al. |
| 8,919,097 | B2 | 12/2014 | Kerns et al. |
| 9,709,448 | B2 | 7/2017 | Desilva et al. |
| 2003/0056517 | A1 | 3/2003 | Brushwood et al. |
| 2010/0055629 | A1 | 3/2010 | McKnight et al. |

(Continued)

FOREIGN PATENT DOCUMENTS

| CN | 101215996 A | 7/2008 |
| EP | 2887027 A1 | 6/2015 |

(Continued)

OTHER PUBLICATIONS

International Search Report and Written Opinion issued for Application No. PCT/US2022/082616, dated Apr. 10, 2023 (16 pages).

*Primary Examiner* — Katheryn A Malatek
(74) *Attorney, Agent, or Firm* — Armstrong Teasdale LLP

(57) ABSTRACT

A method of controlling a fuel blend for a turbine engine is provided. The method includes supplying a first fuel and a second fuel to a mixer and mixing, in the mixer, the first and second fuels together to obtain a fuel blend. The method also includes receiving, at a fuel blend analyzer downstream from the mixer, a measurement indicative of a composition of the fuel blend. The method further includes combusting the fuel blend in a combustor. The method also includes receiving a combustion signal indicative of combustion behavior. The method further includes controlling, based on at least one of the fuel blend measurement and the combustion signal, by a controller, at least one of a flow of the first fuel and a flow of the second fuel.

9 Claims, 5 Drawing Sheets

(56) References Cited

U.S. PATENT DOCUMENTS

| | | | |
|---|---|---|---|
| 2010/0162678 A1* | 7/2010 | Annigeri | F02C 3/22 60/39.463 |
| 2011/0247315 A1 | 10/2011 | Rhoden | |
| 2012/0036863 A1 | 2/2012 | Kirzhner et al. | |
| 2013/0091852 A1 | 4/2013 | Wood et al. | |
| 2014/0203557 A1 | 7/2014 | Kim et al. | |
| 2015/0284102 A1 | 10/2015 | Swann | |
| 2015/0330312 A1* | 11/2015 | Delgado | F02C 9/40 60/39.463 |
| 2015/0337741 A1 | 11/2015 | Gassner et al. | |
| 2015/0337742 A1* | 11/2015 | Bernero | F02C 9/40 60/776 |
| 2016/0208764 A1 | 7/2016 | Mann et al. | |
| 2019/0368426 A1* | 12/2019 | Kanei | F02C 6/00 |

FOREIGN PATENT DOCUMENTS

| | | |
|---|---|---|
| JP | H08312378 A | 11/1996 |
| JP | 2004270642 A | 9/2004 |
| JP | 6267736 B2 | 1/2018 |
| WO | 2023/133074 A1 | 7/2023 |

\* cited by examiner

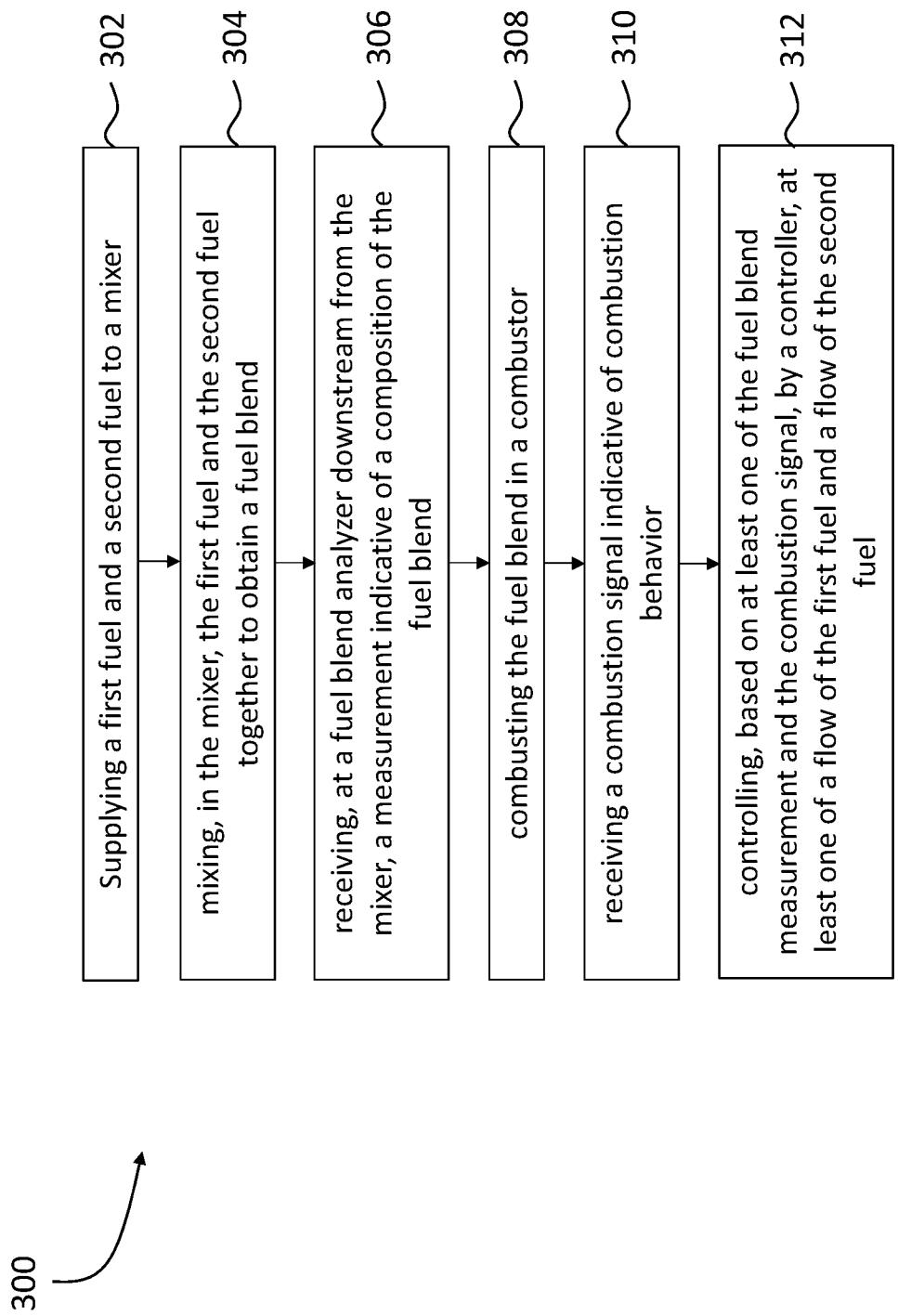

SYSTEMS AND METHODS FOR CONTROLLING A FUEL BLEND FOR A GAS TURBINE

BACKGROUND OF THE INVENTION

The field of the invention relates generally to gas turbine engines and, more particularly, to systems and methods for controlling a fuel blend for gas turbines.

Known gas turbine engines combust a mixture of fuel and oxidant (e.g., air) in a combustor section to generate hot combustion gases. The hot combustion gases flow through a turbine to rotate one or more turbine stages to drive a generator, thus producing electricity. Combustion gases include various combustion by-products, such as nitrogen oxides ($NO_x$), carbon monoxide (CO), and unburned hydrocarbons. Lowering such emissions may be difficult as reducing working temperatures and available oxygen during combustion, to reduce the production of $NO_x$, may increase the levels of CO and unburned hydrocarbons. In an effort to further lower such emissions, some known gas turbines are equipped with Dry Low Emissions (DLE) combustion systems. In DLE systems, fuel and combustion air are mixed at, or before, a combustion zone to produce lean, pre-mixed combustion fuel that limits the formation of $NO_x$ gases during combustion. However, such turbines typically operate over a relatively narrow operational boundary range, as the fuel-to-air ratio needs to be high enough to prevent lean blow-out events, yet low enough to prevent undesirable combustion dynamics (e.g., engine knock).

In some known turbines, determining an appropriate fuel-to-air ratio may be exacerbated by a trend toward reducing the use of higher-cost, yet more efficient, fuels such as natural gas. Cost demands often dictate reducing consumption of these fuels via blending with lower cost, yet less efficient, higher hydrocarbon fuels. Such fuel blends change the heating characteristics of the fuel, which affects the combustion dynamics, and therefore the operation and lifetime, of the gas turbine. To ensure that the DLE combustion system operates within acceptable operational boundaries, it may be necessary to adjust the fuel consumption through the use of fuel scheduling. However, fuel schedules may be inefficient and over time, continued use of fuel scheduling may actually increase the operating costs as different fuels may lead to equipment downtime.

Moreover, the increase in renewable energy sources (e.g., wind or solar) has introduced additional challenges due to unforeseeable power output. As a result, wider fuel flexibility is desired. Recently, significant interest in carbon-neutral hydrogen-based fuels has grown in the effort to achieve wider fuel flexibility. However, the high reactivity of hydrogen may lead to increased flashback risks and undesirable combustion dynamics when hydrogen-doped fuel is mixed with air to facilitate lower $NO_x$ emissions. Thus, challenges remain in integrating hydrogen gas into DLE combustion systems.

Accordingly, there exists a need for improved control of a fuel blend for use in a gas turbine. In particular, it would be desirable to facilitate improved control of a fuel blend without substantial reconfiguration or redesign of existing turbine engine hardware.

BRIEF DESCRIPTION OF THE INVENTION

In one aspect, a method of controlling a fuel blend for a turbine engine is provided. The method includes supplying a first fuel and a second fuel to a mixer and mixing, in the mixer, the first and second fuels together to obtain a fuel blend. The method also includes receiving, at a fuel blend analyzer downstream from the mixer, a measurement indicative of a composition of the fuel blend. The method further includes combusting the fuel blend in a combustor. The method also includes receiving a combustion signal indicative of combustion behavior. The method further includes controlling, based on at least one of the fuel blend measurement and the combustion signal, by a controller, at least one of a flow of the first fuel and a flow of the second fuel.

In another aspect, a fuel control system for a turbine engine is provided. The fuel control system includes a fuel supply system that includes a mixer for use in mixing a first fuel and a second fuel together to obtain a fuel blend. The fuel control system also includes a fuel blend analyzer downstream from the mixer, a combustor downstream from the fuel blend analyzer, and a knock sensor coupled to the combustor. The combustor is operable with the fuel blend. The fuel control system further includes a controller communicatively coupled to the knock sensor and the fuel blend analyzer. The controller includes at least one processor in communication with at least one memory device. The at least one processor is configured to (i) receive, from the knock sensor, a combustion signal indicative of combustion behavior; (ii) receive, from the fuel blend analyzer, a measurement indicative of a composition of the fuel blend; and (iii) adjust at least one of a flow of the first fuel and a flow of the second fuel based on at least one of the combustion signal and the fuel blend measurement.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 5 is a flow chart of an exemplary method of controlling a fuel blend for a turbine engine.

Figure 1:
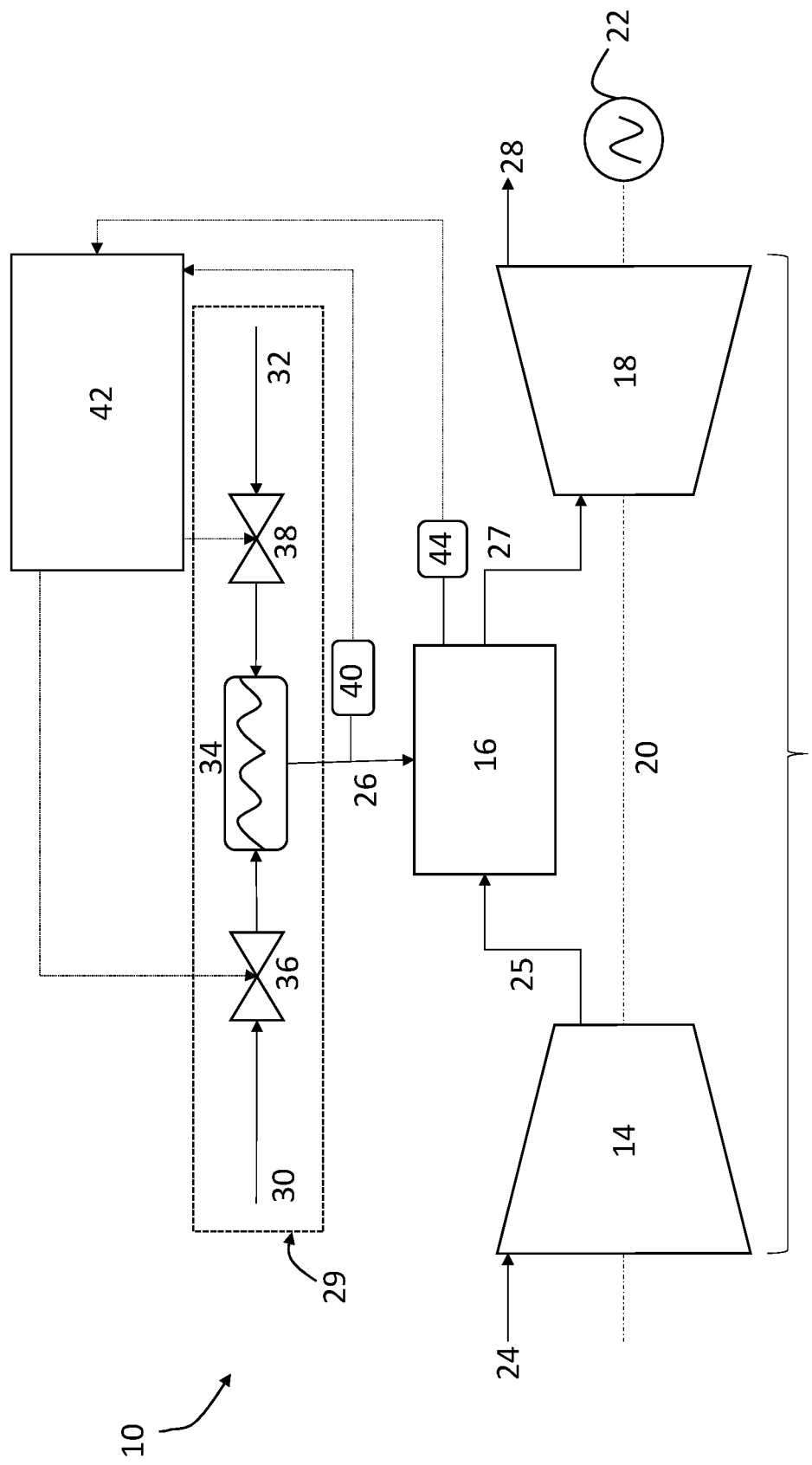
FIG. 1 is a schematic illustration of an exemplary gas turbine system that utilizes fuel blend control.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION OF THE INVENTION

In the following specification and the claims, reference will be made to a number of terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not. Furthermore, references to "one embodiment" are not intended to be interpreted as excluding the existence of additional embodiments that also incorporate the recited features. Moreover, unless explicitly stated to the contrary, embodiments "including" or "having" an element or a plurality of elements having a particular property may include additional such elements not having that property.

As used herein, the term "real-time" refers to either the time of occurrence of the associated events, the time of measurement and collection of predetermined data, the time to process the data, or the time of a system response to the events and the environment. In the embodiments described herein, these activities and events occur substantially instantaneously.

As used herein, the terms "processor" and "computer" and related terms, e.g., "processing device," "computing device," and "controller" are not limited to just those integrated circuits referred to in the art as a computer, but instead refer broadly to a microcontroller, a microcomputer, a programmable logic controller (PLC), an application specific integrated circuit, and/or other programmable circuits, and such terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to only being, computer peripherals associated with an operator interface such as a mouse and a keyboard. Alternatively, other computer peripherals may also be used such as, for example, but not be limited to, a scanner. Furthermore, in the embodiments described herein, additional output channels may include, but are not limited to only being, an operator interface monitor.

FIG. 1 is a schematic illustration of an exemplary gas turbine system 10 that utilizes fuel blend control in accordance with the present disclosure. While FIG. 1 illustrates an exemplary gas turbine engine 12, it should be noted that the methods and systems for fuel blend control described herein are not limited to any particular type of turbine engine. One of ordinary skill in the art should appreciate that the methods and systems for fuel blend control described herein may be used with any rotary machine, in any suitable configuration that enables such a system and method to function as further described herein.

In the exemplary embodiment, the system 10 includes a gas turbine engine 12 with a compressor 14, one or more combustors 16, a turbine 18, a computer control system, or controller 42, and a fuel supply system or skid 29. A shaft 20 extends axially and couples the compressor 14 to the turbine 18. Turbine engine 12 may be coupled to a generator 22 via shaft 20 to produce electrical power. An oxidant 24 (e.g., air) is introduced into compressor 14, where it is compressed and channeled to combustor 16 as a compressed oxidant 25. A fuel blend 26 is provided from fuel supply system 29 into the combustor 16, where it is mixed with the compressed oxidant 25. The mixture of the fuel blend 26 and oxidant 25 is combusted in combustor 16, and the exiting hot combustion gases 27 are expanded to perform work in the subsequent turbine 18. The exhaust gases 28 may exit the turbine 18 through an exhaust duct (not shown) and may be used, for example, in a heat recovery steam generator system (not shown) to generate steam from thermal energy extracted from the exhaust gases. Alternatively, the exhaust gases 28 may undergo emissions control treatment (e.g., selective catalytic reduction) to remove unwanted combustion by-products (e.g., NON) from the exhaust stream.

The fuel supply system 29 that supplies fuel blend 26 to combustor 16 uses a flow of a first fuel 30 and a flow of a second fuel 32. The first fuel 30 and the second fuel 32 are supplied to mixer 34 in which the first fuel 30 and second fuel 32 are mixed to produce fuel blend 26. Mixer 34 may be, for example, a static inline mixer.

A wide variety of fuels are contemplated for use as the first fuel 30 and/or the second fuel 32. For example, in some embodiments, first fuel 30 and/or second fuel 32 may be a hydrocarbon fuel that is present in a gaseous state at atmospheric pressure and temperature (also referred to herein as a "hydrocarbon gas fuel"). Non-limiting examples of such hydrocarbon gas fuels include methane, ethane, propane, butane, and/or combinations thereof. In some embodiments, the first fuel 30 and/or second fuel 32 may be a natural gas (i.e., hydrocarbon gas fuel with methane as the main constituent). In other embodiments, the first fuel 30 and/or second fuel 32 may be a hydrocarbon gas fuel that is in a liquid state as a result of cooling and/or compressing the gas (also referred to herein as a "liquefied hydrocarbon fuel"). For example, first fuel 30 and/or second fuel 32 may be liquefied petroleum gas (i.e., propane, butane, and mixtures thereof) or any other liquefied hydrocarbon fuel, such as pentane, methanol, ethanol, and/or dimethyl ether. Alternatively, first fuel 30 and/or second fuel 32 may be a hydrocarbon fuel that is present in a liquid state at atmospheric pressure and temperature (also referred to herein as a "hydrocarbon liquid fuel"). Non-limiting examples of such hydrocarbon liquid fuels include diesel, kerosene, naphtha, and other distillate fuels, crude oil (petroleum), and residual fuels such as heavy fuel oil, medium fuel oil, and light fuel oil.

First fuel 30 or second fuel 32 may also be hydrogen. In these embodiments, hydrogen is used as first fuel 30 or second fuel 32 and is mixed with a hydrocarbon fuel used as the other of first fuel 30 or second fuel 32. The hydrogen fuel may be pure hydrogen or may be provided in a synthetic gas mixture (also referred to herein as "syngas") that is mixed upstream from fuel supply system 29 with another hydrocarbon gas and other compounds such as carbon monoxide (CO), carbon dioxide ($CO_2$), and/or water vapors. In general, hydrogen may be stored in its pure form within the gas turbine system 10. Moreover, system 10 may also include an electrolysis unit (not shown) to generate the pure hydrogen from water.

In general, first fuel 30 and second fuel 32 are different fuels. Typically, first fuel 30 and second fuel 32 are of the same phase when supplied to mixer 34 and mixed. In this respect, when first fuel 30 is, for example, a hydrocarbon gas fuel (e.g., natural gas) and second fuel 32 is a different phase fuel, for example, a liquefied fuel (e.g., liquefied petroleum gas or liquefied hydrogen), a vaporizer (not shown) may be provided upstream from mixer 34 to vaporize the liquefied fuel 32 before it is supplied to mixer 34 and mixed with hydrocarbon gas fuel 30.

Use of different fuels 30 and 32 to produce fuel blend 26 may facilitate wider fuel flexibility in turbine engine 12. For example, a higher reactive fuel may be used as first fuel 30 or second fuel 32 and is mixed with a lower reactive fuel used as the other of first fuel 30 or second fuel 32. A consequence of mixing the different first and second fuels 30 and 32 is that the combustion dynamics and/or emissions associated with the produced fuel blend 26 may not be known. If a composition of fuel blend 26 falls below a certain fuel reactivity limit, as may be the case, for example, when relatively high amounts of low reactive fuels such as crude oil and residuals are used as first fuel 30 or second fuel 32, unacceptable combustion conditions such as flame loss (lean blow-out) and/or engine knock, and/or increased CO emissions may result. Alternatively, if a composition of fuel blend 26 has too high reactivity, as may be the case, for example, when relatively high amounts of hydrogen are used as first fuel 30 or second fuel 32, unacceptable combustion conditions such as flashback and/or overheating, and/or increased $NO_x$ emissions may result. Accordingly, in order to facilitate combustion stability of turbine engine 12 in operation with fuel blend 26, the composition of fuel blend 26 should be controlled so that the reactivity of fuel blend 26 is within the operational boundaries of combustor 16.

In the exemplary embodiment, control valves 36 and 38 are located on the first fuel 30 and second fuel 32 supply lines, respectively, to control the flow of the individual fuels 30 and 32 to mixer 34. However, in some embodiments, other flow control means may be used. For example, the flow of the first fuel 30 and second fuel 32 may be controlled by adjusting a speed of a fuel pump (not shown) using feedback control signals from flow sensors (e.g., sensors 46 and 48 shown in FIG. 2) on each respective fuel line. In some embodiments, only one of the control valves 36 or 38 may be used. In other embodiments, one of the control valves 36 or 38, or a third control valve (not shown), may be provided downstream from mixer 34 and upstream from combustor 16.

A fuel blend analyzer unit 40 is downstream from mixer 34 to obtain a measurement of fuel blend 26 indicative of a composition of fuel blend 26. Such measurement includes, for example, concentration levels of fuel components and/or other properties of the fuel blend such as, but not limited to, flash point, critical point, specific gravity, density, molecular weight, and/or heating value. To this end, fuel blend analyzer 40 may include, for example, any of a gas chromatograph, a specific gravity sensor, a density meter, and/or a Wobbe meter. In some embodiments, fuel blend analyzer 40 may also include additional sensors (not shown) to obtain a measurement of fuel blend 26 such as, for example, fuel pressure, fuel pressure drop, fuel flow rate, fuel flow velocity, and/or fuel temperature. Fuel blend analyzer 40 is communicatively coupled to controller 42 to provide a measurement of the fuel blend 26 to the controller 42 for processing, as described in more detail herein.

A knock sensor 44 is coupled to combustor 16 to obtain a combustion signal indicative of combustion behavior in combustor 16. The knock sensor 44 may include an acoustic or sound sensor, a vibration sensor, an acceleration sensor, a movement sensor, and/or combinations thereof. The sensor 44 monitors acoustics and/or vibrations associated with combustion in the combustor 16 and detects a knock condition For example, knock sensor 44 may detect a knock condition based on acoustics and/or vibrations indicative of combustion of the mixture of fuel blend 26 and oxidant 24 occurring at an unexpected time during the normal operation cycle of turbine engine 12. Knock sensor 44 may include any sensor capable of sensing vibration, pressure, acceleration, deflection, or movement to enable the system 10 to function as described herein. Knock sensor 44 is communicatively coupled to controller 42 to provide a combustion signal to controller 42 for processing, as described in more detail herein.

Controller 42 is a computer system that includes at least one processor (not shown) and at least one memory device (not shown). The memory device may include a non-transitory computer-readable medium and program that are accessed by the processor to execute operations to control a composition of fuel blend 26 provided to combustor 16 based, at least in part, on a measurement received from fuel blend analyzer 40 and/or on a combustion signal received from knock sensor 44. Operations executed by controller 42 include applying a control algorithm to adjust the flow of first fuel 30 and/or second fuel 32 supplied to mixer 34. For example, controller 42 may include and/or generate an operational model of turbine engine 12. Controller 42 may compare a measurement of fuel blend 26 and/or a combustion signal to the model to generate control outputs transmitted to control valves 36 and 38. The operational model may define operational boundaries of turbine engine 12. Controller 42 may identify that a composition of fuel blend 26 presents a risk of violating the operational boundaries, causing unacceptable combustion conditions (e.g., lean blow-out, engine knock, flashback, and/or overheating). In this respect, controller 42 may predict a combustion condition associated with a composition of fuel blend 26. Controller 42 may thereby determine in real-time whether the composition of the fuel blend 26 should be adjusted. In response, controller 42 may generate an output signal that causes one or both control valves 36 and 38 to adjust (e.g., increase or decrease) the flow of the first fuel 30 and/or the second fuel 32 supplied to mixer 34.

A combustion signal received from knock sensor 44 may also be used to adjust the composition of fuel blend 26. For example, controller 42 may analyze a measurement of fuel blend 26 when a knock condition is detected and generate output signals accordingly. Additionally or alternatively, a combustion signal may be used in a feedback application to update the operational model. For example, controller 42 may compare the combustion signal to the predicted combustion condition determined by comparing the fuel blend measurement to the operational model. Controller 42 may determine whether the predicted combustion condition matches the combustion behavior indicated by the combustion signal. If the predicted combustion condition does not match the combustion behavior, controller 42 may update the operational model by associating the measurement of fuel blend 26 with a detected knock condition to facilitate a future knock condition being predicted in real-time when a similar measurement of fuel blend 26 is obtained.

Figure 2:
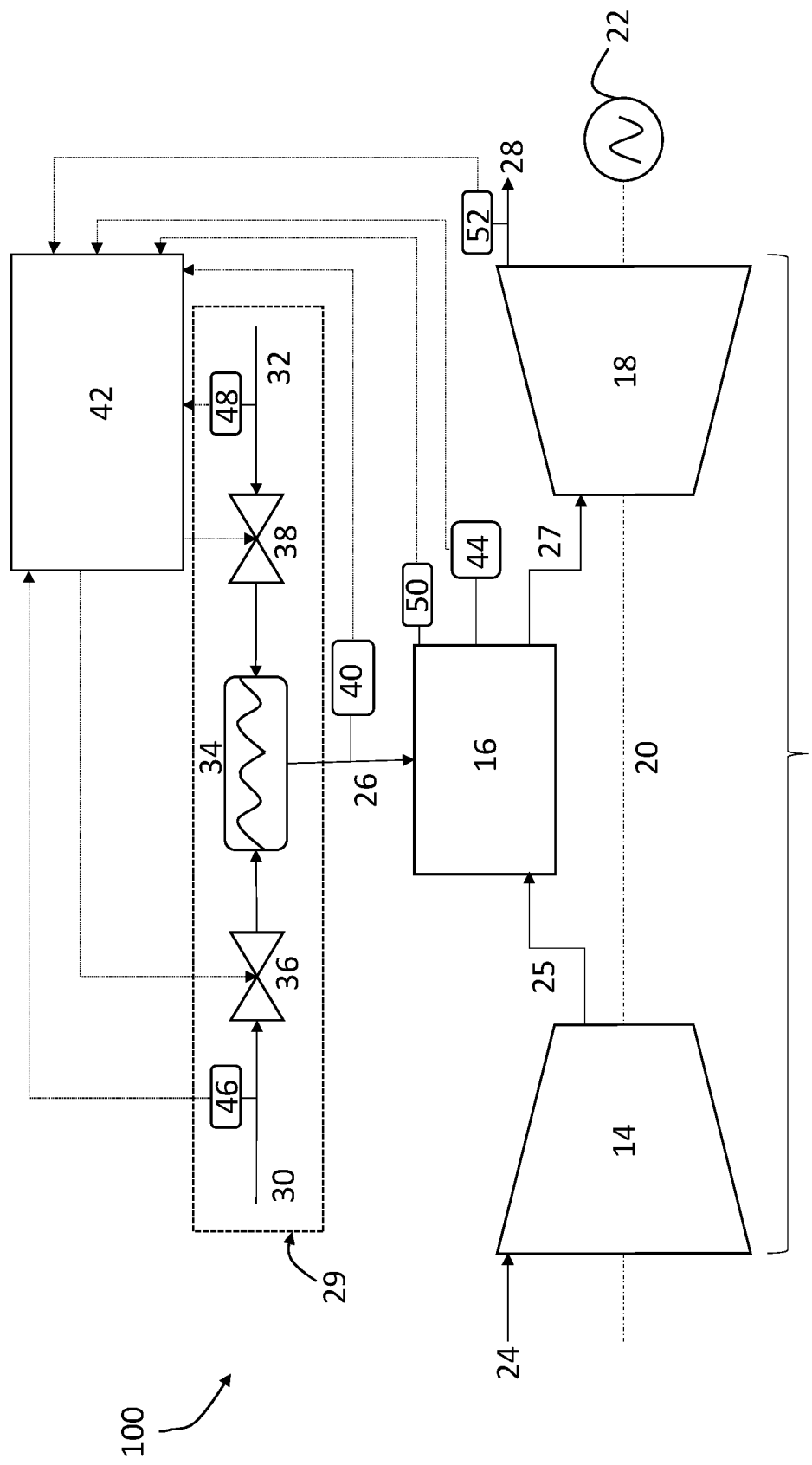
FIG. 2 is a schematic illustration of an alternative gas turbine system that utilizes fuel blend control.

FIG. 2 is a schematic illustration of an alternative gas turbine system 100 that utilizes fuel blend control in accordance with the present disclosure. Gas turbine system 100 includes all the elements and components shown in FIG. 1 and described herein for gas turbine system 10. In addition, system 100 includes at least one additional sensor (e.g., sensors 46, 48, 50, and/or 52) that is communicatively coupled to controller 42. In the alternative embodiment, controller 42 receives an additional sensor input from the additional sensor 46, 48, 50, and/or 52 and may use the additional sensor input to monitor operating parameters of turbine engine 12, to adjust the flow of the first fuel 30 and/or the second fuel 32 supplied to mixer 34, and/or to update the operational model by associating a measurement of fuel blend 26 with an operating parameter of turbine engine 12.

As shown in FIG. 2, controller 42 is communicatively coupled to one or both of sensors 46 and/or 48 to obtain a measurement of the first fuel 30 and second fuel 32, respectively. Sensors 46 and 48 may each obtain a measurement indicative of a composition of the respective fuel 30 and 32 such as, for example, concentration levels of fuel components and/or other properties of the respective fuel 30 and 32 such as, but not limited to, flash point, critical point, specific gravity, density, molecular weight, and/or heating value. To this end, sensors 46 and 48 may each include, for example, any of a gas chromatograph, a specific gravity sensor, a density meter, and/or a Wobbe meter. In the alternative embodiment, sensors 46 and 48 are located upstream from control valves 36 and 38, respectively. Controller 42 uses a measurement of either the first fuel 30 and/or the second fuel 32 obtained from sensors 46 and/or 48, respectively, along with a measurement of fuel blend 26 obtained from fuel blend analyzer 40 to determine a composition of fuel blend 26. For example, controller 42 may receive a measurement indicative of an overall composition of fuel blend 26 from fuel blend analyzer 40 and supplement that input with a measurement indicative of a composition of the first fuel 30 and/or second fuel 32 in a feedforward application. Controller 42 may thereby determine a composition of the fuel blend 26 based on the measurements obtained from fuel blend analyzer 40 and sensor 46 and/or 48. In this respect, improved accuracy of the measured composition of fuel blend 26 may be facilitated with the supplemental measurement of either the first fuel 30 and/or second fuel 32 received from the corresponding sensor 46 and/or 48.

In other embodiments, sensors 46 and 48 may suitably be downstream from the corresponding control valves 36 and 38 and upstream from mixer 34. In these embodiments, sensors 46 and 48 may additionally, or alternatively, each obtain a measurement that indicates a flow of the respective fuel 30 and 32 supplied to mixer 34. For example, sensors 46 and 48 may each obtain a mass flow or volume flow measurement of the respective fuel 30 and 32. In still other embodiments, sensors 46 and 48 may each obtain any other measurement that enables system 100 to function as described herein.

As shown in FIG. 2, controller 42 is also communicatively coupled to sensor 50 that obtains a measurement of an operating parameter of gas turbine engine 12. While shown in FIG. 2 as a single sensor 50, it should be appreciated that sensor 50 may include more than one sensor 50. In the exemplary embodiment, sensor 50 is coupled to combustor 16 to obtain a measurement indicative of a combustion behavior of combustor 16. Sensor 50 may be an optical sensor that detects a flame intensity within a cylinders of combustor 16. The optical sensor 50 transmits a signal to controller 42 corresponding to an intensity of the flame within the at least one cylinder. Sensor 50 may alternatively be a temperature sensor that measures an operating temperature within combustor 16, such as a combustor inlet temperature, a burner temperature, and/or a combustor metal temperature. In alternative embodiments, sensor 50 may be coupled to turbine 18 to detect operating parameters of turbine 18, such as a local turbine operating temperature, a turbine inlet temperature, and/or a turbine outlet temperature. In still other embodiments, sensor 50 may be a pressure sensor that measures an operating pressure within combustor 16 and/or turbine 18. Sensor 50 may be any other sensor used to obtain any other measurement of an operating parameter of turbine engine 12 that enables system 100 to function as described herein.

As shown in FIG. 2, controller 42 is also communicatively coupled to sensor 52 that obtains a measurement of the exhaust gases 28 exiting turbine 18. Sensor 52 may suitably be coupled to an exhaust duct (not shown) downstream from turbine 18. Additionally or alternatively, sensor 52 may be coupled to an exhaust stack (not shown) to obtain a measurement of the exhaust gases 28 exiting a selective catalytic reduction (SCR) treatment system (not shown). Sensor 52 may be, for example, an emissions sensor that detects a level of one or more pollutants (e.g., CO, $CO_2$ and/or NON) in the exhaust gases 28. Sensor 52 may additionally, or alternatively, sense an amount of unburned hydrocarbons in the exhaust gases 28. Sensor 52 may obtain any other measurement of the exhaust gases 28 that enables system 100 to function as described herein.

Figure 3:
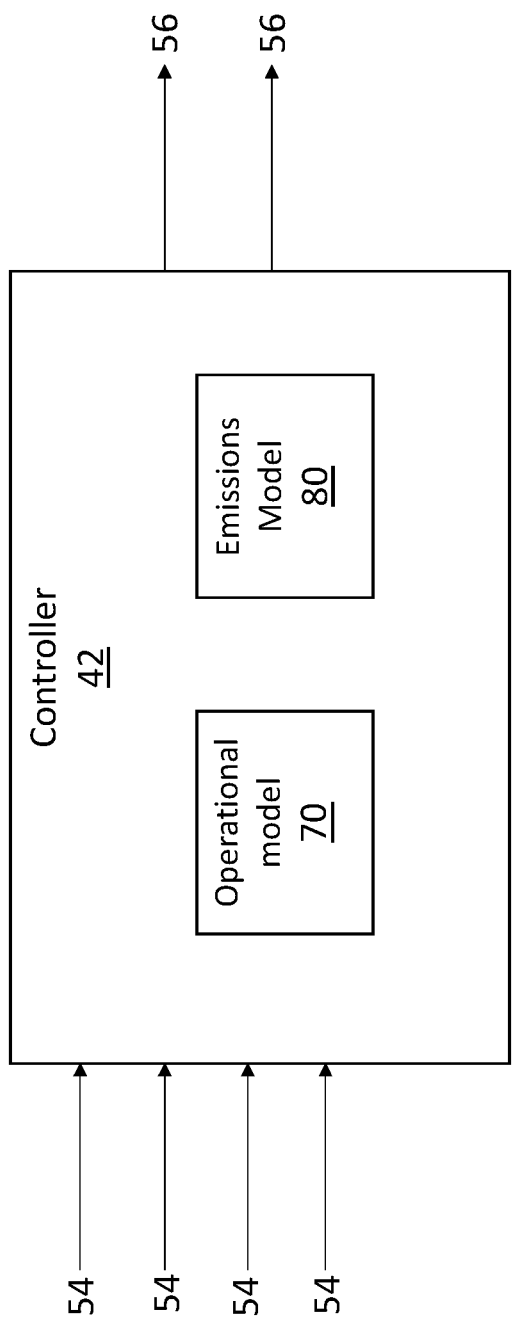
FIG. 3 is a block diagram of an exemplary controller for use in the fuel blend control shown in either FIGS. 1 and/or 2.

FIG. 3 shows an exemplary block diagram of controller 42. Controller 42 receives inputs 54 that include a measurement of fuel blend 26 obtained from fuel blend analyzer 40 and a combustion signal obtained from knock sensor 44 (shown in FIG. 1). Inputs 54 may also include measurements obtained from sensors 46, 48, 50, and/or 52 (shown in FIG. 2). Controller 42 processes inputs 54 and generates outputs 56. Outputs 56 are transmitted to control valves 36 and 38. Outputs 56 cause either the control valve 36 and/or 38 to adjust a flow of the respective fuel 30 and 32 supplied to mixer 34, thus adjusting the composition of fuel blend 26 exiting mixer 34.

Controller 42 may execute one or more model-based control algorithms and may generate outputs 56 by comparing a measurement of fuel blend 26 to a model. For example, as described herein, controller 42 may include and/or generate an operational model 70 that defines operational boundaries of turbine engine 12. The operational boundaries may be determined by modeling operation of turbine engine 12 and/or by receiving operational parameters of turbine engine 12 as inputs 54. For example, operational model 70 may model combustion dynamics within combustor 16. Controller 42 receives a measurement indicative of a composition of fuel blend 26 as inputs 54 and may compare the measurement to operational model 70 to predict combustion dynamics within combustor 16. Controller 42 may thereby determine in real-time that a composition of fuel blend 26 supplied to combustor 16 may cause unacceptable combustion conditions such as, for example, engine knock, flashback, and/or a lean blow-out event. In response, controller 42 may generate control outputs 56 that are transmitted to one or both control valves 36 and 38 and cause the flow of first fuel 30 and/or second fuel 32 to be adjusted, thus adjusting the composition of fuel blend 26. In this respect, continuously comparing the measurement of fuel blend 26 to operational model 70 may enable real-time adjustment of the composition of fuel blend 26 before a detrimental condition within combustor 16 occurs.

In addition, controller 42 receives a combustion signal from knock sensor 44 as an input 54. The combustion signal input 54 provides feedback of combustion dynamics within combustor 16 that may be used to adjust a composition of fuel blend 26 and/or to update operational model 70. For example, controller 42 may determine that the composition of fuel blend 26 should be adjusted in response to an identified knock condition, and in response generates control outputs 56 as described herein. Additionally or alternatively, combustion signal input 54 may be used to determine that the measurement of fuel blend 26 is associated with the detected knock condition. In response, controller 42 may update the operational model 70 to facilitate a future knock condition being predicted in real-time when a similar measurement of fuel blend 26 is obtained.

Controller 42 may also receive as inputs 54 measurements from any of sensors 46, 48, 50, and/or 52 (shown in FIG. 2) to update operational model 70 and/or to generate control outputs 56. For example, controller 42 may receive as inputs 54 a measurement of either first fuel 30 and/or second fuel 32 obtained from respective sensor 46 and 48. Such input 54 may be used by controller 42 as a feedforward signal to supplement a measurement of fuel blend 26 obtained from fuel blend analyzer 40, as described herein. In embodiments where either sensor 46 and/or 48 obtains a flow measurement of the respective fuel 30 and 32, controller 42 may use the measurement as a control parameter in generating outputs 56. That is, controller 42 may generate outputs 56 to cause either control valve 36 and/or 38 to adjust the flow of first fuel 30 and/or second fuel 32, respectively, to mixer 34 to a desired flow rate. Controller 42 may also receive, in addition to a combustion signal obtained by knock sensor 44, other measured combustion parameters (e.g., flame intensity, temperature, and/or pressure) as inputs 54. Such inputs 54 provide continuous feedback of combustion dynamics within combustor 16 that may be used to adjust a composition of fuel blend 26 and/or to update operational model 70, as described herein. It should be appreciated that any additional measurement obtained from sensor 46, 48, 50, and/or 52 as described herein may be used to enable controller 42 to function as described herein.

Controller 42 may also generate and/or include an emissions model 80 that enables controller 42 to predict in real-time a level of pollutants (e.g., a level of CO, $CO_2$, and/or NON) in exhaust gases 28 exiting turbine 18. Emissions model 80 may be generated based on operating parameters (e.g., power output or load) of turbine engine 12 that are modeled or monitored in real-time by controller 42. Controller 42 may compare a measurement of fuel blend 26 to emissions model 80. Based on the comparison, controller 42 may determine whether a composition of fuel blend 26 may potentially create an unacceptable level of pollutants in the exhaust gases 28. In response, controller 42 may generate outputs 56 to adjust a composition of fuel blend 26 as described herein, to achieve an appropriate composition of fuel blend 26 to satisfy pre-determined emissions limits.

Controller 42 may also receive, as an input 54, an emissions level measurement associated with exhaust gases 28, from sensor 52 (shown in FIG. 2). The emissions level measurement may provide real-time feedback of a level of pollutants in exhaust gases 28 which may be used to adjust a composition of fuel blend 26 and/or to update emissions model 80. For example, controller 42 may determine that the composition of fuel blend 26 should be adjusted in response to a detected level of pollutants, and in response generates control outputs 56 as described herein. As described herein, the input 54 from sensor 52 may also include a measurement of exhaust gases 28 exiting an SCR treatment system (not shown). In this respect, variations within the SCR treatment system may be used by controller 42 to determine that the composition of fuel blend 26 should be adjusted. Additionally or alternatively, controller 42 may update emissions model 80 using a measurement obtained by sensor 52 and received as an input 54. For example, controller 42 may compare a predicted level of pollutants to the emissions level measurement. Controller 42 may determine whether the predicted level of pollutants matches an actual level of pollutants measured by sensor 52, or controller 42 may determine that a difference exists between the predicted level of pollutants and the actual level of pollutants. In response, controller 42 may update emissions model 80 to facilitate improving accuracy of a future predicted level of pollutants associated with a similar measurement of fuel blend 26.

Controller 42 may integrate emissions model 80 with operational model 70. Thereby, controller 42 may facilitate optimizing a composition of fuel blend 26 by determining whether the measurement of fuel blend 26 is associated with combustion conditions within operational boundaries and is associated with an acceptable level of pollutants in exhaust gases 28. In this respect, controller 42 facilitates wider flexibility in the use of lower cost fuels such as, for example, hydrocarbon liquid fuels, as well as carbon-neutral fuels, such as, for example, hydrogen fuels. Controller 42 may also generate and/or include an overall economic model (not shown) that incorporates operational model 70 and emissions model 80 together with expected costs and profitability associated with the use of a particular fuel blend 26 and/or with the use of a particular individual fuel 30 and/or 32. In this respect, controller 42 may facilitate optimizing a composition of fuel blend 26 and maximizing overall revenue over the operational lifetime of gas turbine system 10.

Figure 4:
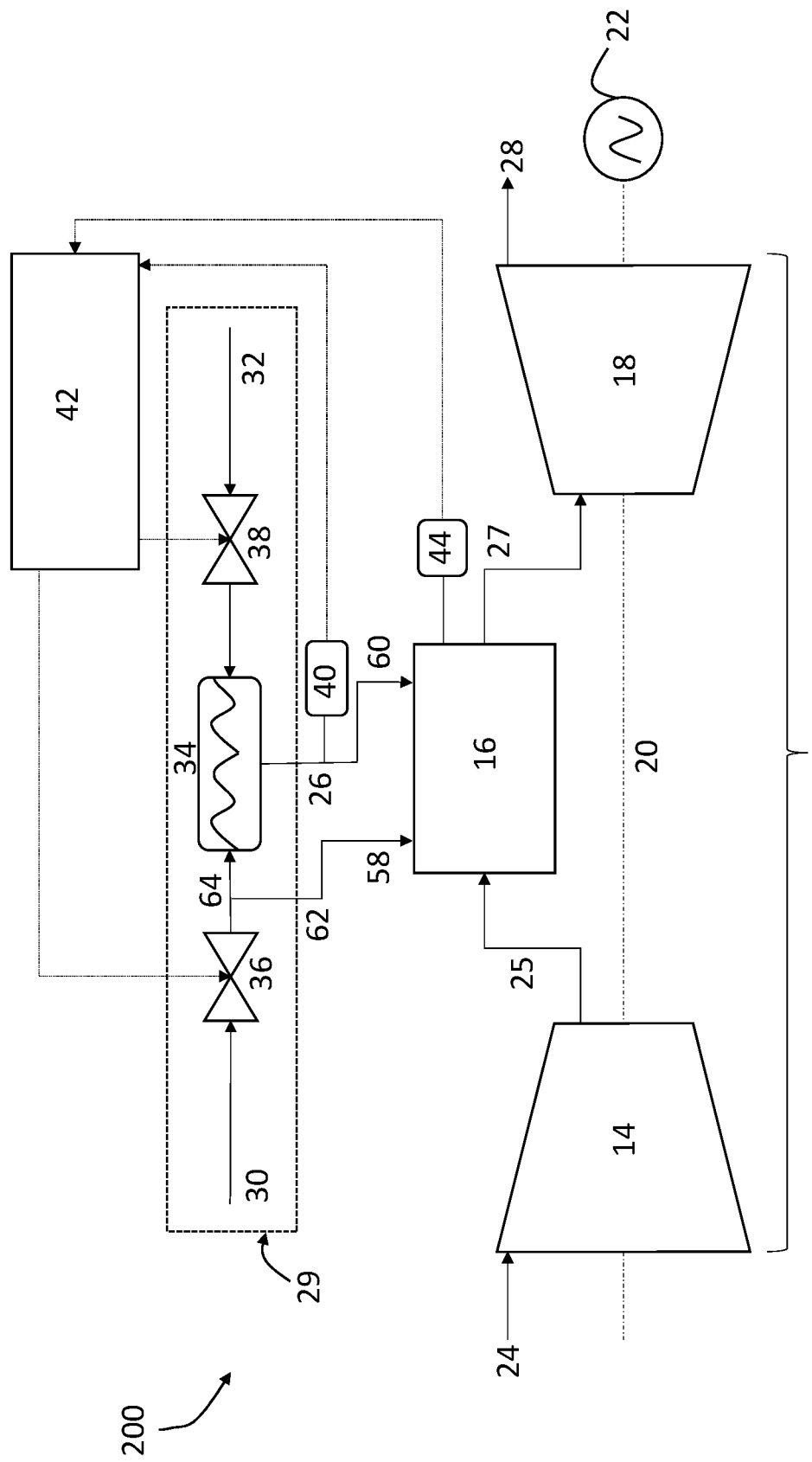
FIG. 4 is a schematic illustration of a second alternative gas turbine system that utilizes fuel blend control.

FIG. 4 is a schematic illustration of a second alternative gas turbine system 200 that utilizes fuel blend control in accordance with the present disclosure. Gas turbine system 200 includes all the elements and components as either gas turbine system 10 and/or 100 shown in FIGS. 1 and 2, respectively, and described herein. In addition, in the second alternative embodiment, gas turbine system 200 includes a staged combustor 16. Combustor 16 may be, for example, an axially-staged or radially-staged combustor 16. Typically, staged combustion systems operate by introducing a lean mixture of premixed fuel and air at a first stage 58, and a rich mixture of fuel having a higher equivalence ratio at a second stage 60. Introducing the lean mixture at the first stage 58, which has a relatively lower flame temperature, facilitates reducing the residence time of fuel in a high temperature combustion environment (e.g., at the second stage 60). Accordingly, staged combustors may minimize $NO_x$ emissions, and the increased combustion efficiency may additionally lower levels of other pollutants, such as CO and unburned hydrocarbons. In addition, combustion staging may also reduce undesirable combustion dynamics in combustor 16 by spreading the combustion reactions over multiple zones. However, increased flexibility in staged combustors is desired to optimize reaction rates and improve combustion stability. In addition, the impact of changing thermally-induced emissions and combustion dynamics as a result of blended fuels remains a challenge and may require substantial hardware reconfiguration in staged combustion systems.

As shown in FIG. 4, fuel supplied to staged combustor 16 is divided between a first stage 58 and a second stage 60. First fuel 30 is split upstream from mixer 34 into a first portion 62 directed to first stage 58 and a second portion 64 supplied to mixer 34, with fuel blend 26 being directed to second stage 60. In other embodiments, system 200 may include a fuel separator or manifold (not shown) downstream from mixer 34 that separates fuel blend 26 into a first portion (not shown) directed to first stage 58 and at least a second portion (not shown) directed to the at least second stage 60. First fuel 30 may suitably be a lower reactive fuel (i.e., has a relatively slower reaction rate) than second fuel 32. For example, first fuel 30 may be a hydrocarbon gas fuel, such as natural gas, or a liquefied hydrocarbon fuel, such as liquefied petroleum gas, and second fuel 32 may be hydrogen. As such, fuel blend 26 exiting mixer 34 may comprise a suitable mixture of the lower reactive fuel 30 and higher reactive fuel 32. Air (not shown) may be introduced at the first stage 58 or mixed with fuel (e.g., first fuel 30) directed to first stage 58 to produce a lean-premixed fuel. Inert gases (e.g., nitrogen) may be introduced at the second stage 60, or mixed with fuel (e.g., fuel blend 26) directed to second stage 60 to facilitate improving thermal management and/or to provide cooling.

As described herein, fuel blend analyzer 40 obtains a measurement indicative of a composition of fuel blend 26. Controller 42 receives this measurement and determines whether a composition of fuel blend 26 may create combustion dynamics that are outside of pre-determined operational boundaries. For example, controller 42 may determine that a composition of fuel blend 26 is indicative of a fuel composition that will not withstand flame temperatures in second stage 60, and that may lead to premature combustion. Alternatively, controller 42 may determine that a composition of fuel blend 26 is indicative of a fuel composition that may create a lean blow-out event. Controller 42 also receives a combustion signal from knock sensor 44 that may detect knock conditions at the first stage 58 and/or second stage 60.

In response to identifying a fuel blend measurement indicative of combustion dynamics that are outside of pre-determined operational boundaries, and/or detecting a knock condition, controller 42 may generate outputs 56 (shown in FIG. 3) to cause control valves 36, 38 to adjust a flow of first fuel 30 or second fuel 32, respectively. In this respect, controller 42 may adjust a composition of fuel blend 26 supplied to second stage 60 that will burn quickly, with minimal residence time. Controller 42 thereby controls a composition of fuel blend 26 supplied to second stage 60 to facilitate optimizing reaction rates and combustion dynamics of the staged combustion. An additional fuel analyzer, such as sensor 46 shown in FIG. 2, may obtain a measurement of first fuel 30 supplied to mixer 34 and first stage 58. Controller 42 may receive this measurement and in response may generate an output that causes control valve 36 to adjust a flow of first fuel 30 to optimize combustion conditions in both first stage 58 and second stage 60. It should be appreciated that any additional measurement obtained from sensor 46, 48, 50, and/or 52 as described herein may be used to enable controller 42 to function as described herein.

FIG. 5 is a flow chart of an exemplary method 300 of controlling a fuel blend 26 for a gas turbine engine 12. A first fuel 30 and a second fuel 32 are supplied 302 to mixer 34, whereby the first fuel 30 and second fuel 32 are mixed 304 together to obtain fuel blend 26. As described herein, a fuel blend analyzer 40 located downstream from mixer 34 receives 306 a measurement that is indicative of a composition of fuel blend 26. Controller 42 is communicatively coupled to fuel blend analyzer 40 and receives the measurement of fuel blend 26 from fuel blend analyzer. Controller is also communicatively coupled to a knock sensor 44 coupled to a combustor 16 of gas turbine engine 12. The fuel blend 26 is supplied to combustor 16 whereby it is combusted 308. The knock sensor 44 receives 310 a combustion signal that is indicative of combustion behavior of combustor 16. Controller receives the combustion signal from knock sensor 44. Controller 42 generates control outputs 56 to control 312 at least one of a flow of first fuel 30 and/or a flow of second fuel 32. In particular, controller 42 generates the control outputs 56 based on the measurement of fuel blend 26 and/or the combustion signal, thereby adjusting the composition of fuel blend 26.

The above-described systems and methods facilitate real-time control of a fuel blend for a turbine engine by adjusting a flow of a first fuel and/or a second fuel in response to a detected composition of the fuel blend and/or monitored combustion dynamics within the turbine engine. Thereby, the systems and methods described herein facilitate optimizing durability, emissions, and power (Megawatt) output for a turbine engine that is operable with a wide range of variable fuels. Moreover, using a fuel blend analyzer downstream from a mixer to obtain a measurement indicative of a composition of the fuel blend facilitates the controller to execute predictive algorithms of combustion conditions and/or emissions before or during combustion of the fuel blend. This facilitates the controller to react faster to changes in a fuel blend composition due to, for example, changes in the availability of fuels or load schedules, compared to fuel blend control systems and methods that use only feedback of combustion dynamics in the combustor, where unacceptable combustion conditions may occur before the controller can cause a change in the fuel blend composition. Further, obtaining measurements of the fuel blend downstream from mixing the individual fuels facilitates improving the accuracy of a determined composition of the fuel blend. This may be advantageous when, for example, hydrogen fuel is mixed with a hydrocarbon fuel, where even a small change in the measurement of the fuel blend (e.g., a specific gravity or density measurement) corresponds to a change in the hydrogen content in the fuel blend. Obtaining measurements of the fuel blend downstream from mixing the individual fuels also facilitates determining a composition of the fuel blend using fewer measurements and/or instruments.

Exemplary technical effects of the systems and methods described herein include, but are not limited to including: (a) facilitating improvements in combustion dynamics in an engine operable with a fuel blend using predictive algorithms coupled with combustion signal feedback; (b) facilitating improvements in fuel blend detection and a faster response time to changes in a fuel blend composition; (c) enabling wider fuel flexibility in low-emission gas turbines; and (d) facilitating cost optimization from more reliable fuel blending.

Further aspects of the present disclosure are provided by the subject matter of the following clauses:

1. A method of controlling a fuel blend for a turbine engine, said method comprising: supplying a first fuel and a second fuel to a mixer; mixing, in the mixer, the first and second fuels together to obtain a fuel blend; receiving, at a fuel blend analyzer downstream from the mixer, a measurement indicative of a composition of the fuel blend; combusting the fuel blend in a combustor; receiving a combustion signal indicative of combustion behavior; and controlling, based on at least one of the fuel blend measurement and the combustion signal, by a controller, at least one of a flow of the first fuel and a flow of the second fuel.

2. The method according to any preceding clause, wherein the combustion signal is received by a knock sensor coupled to the combustor.

3. The method according to any preceding clause, wherein controlling, based on at least one of the fuel blend measurement and the combustion signal, by the controller, comprises transmitting, by the controller, an output signal to at least one control valve upstream from the mixer.

4. The method according to any preceding clause, further comprising: comparing, by the controller, the fuel blend measurement to an operational model of the combustor; determining, based on the comparison, by the controller, a predicted combustion condition associated with the fuel blend measurement; and controlling, based on the predicted combustion condition, by the controller, at least one of the flow of the first fuel and the flow of the second fuel.

5. The method according to any preceding clause, further comprising: comparing, by the controller, the predicted combustion condition to the combustion signal; determining, by the controller, whether the predicted combustion condition matches the combustion behavior indicated by the combustion signal; and updating the operational model if the predicted combustion condition does not match the indicated combustion behavior.

6. The method according to any preceding clause, further comprising: receiving, at at least one fuel sensor upstream from the mixer, at least one measurement indicative of a composition of at least one of the first fuel and the second fuel; determining, based on the fuel blend measurement and the at least one measurement of at least one of the first fuel and second fuel, by the controller, a composition of the fuel blend; and controlling, based on at least one of the determined fuel blend composition and the combustion signal, by the controller, at least one of the flow of the first fuel and the flow of the second fuel.

7. The method according to any preceding clause, further comprising: comparing, by the controller, the fuel blend measurement to an emissions model of the combustor; determining, based on the comparison, by the controller, a predicted level of pollutants associated with the fuel blend measurement; and controlling, based on the predicted level of pollutants, by the controller, at least one of the flow of the first fuel and the flow of the second fuel.

8. The method according to any preceding clause, further comprising: receiving, at an emissions sensor downstream from the combustor, an emissions level measurement; comparing, by the controller, the predicted level of pollutants to the emissions level measurement; determining, by the controller, whether the predicted level of pollutants matches the emissions level measurement; and updating the emissions level model if the predicted level of pollutants does not match the emissions level measurement.

9. The method according to any preceding clause, wherein the first fuel is natural gas and the second fuel is hydrogen.

10. The method according to any preceding clause, wherein the first fuel is liquefied petroleum gas and the second fuel is hydrogen.

11. The method according to any preceding clause, wherein the first fuel is a hydrocarbon gas fuel and the second fuel is a liquefied hydrocarbon fuel.

12. The method according to any preceding clause, further comprising vaporizing the liquefied hydrocarbon fuel prior to supplying the liquefied hydrocarbon fuel to the mixer.

13. A fuel control system for a turbine engine, said system comprising: a fuel supply system comprising a mixer for use in mixing a first fuel and a second fuel together to obtain a fuel blend; a fuel blend analyzer downstream from the mixer; a combustor downstream from the fuel blend analyzer, the combustor operable with the fuel blend; a knock sensor coupled to the combustor; and a controller communicatively coupled to the knock sensor and the fuel blend analyzer, the controller comprising at least one processor in communication with at least one memory device, the at least one processor configured to: receive, from the knock sensor, a combustion signal indicative of combustion behavior; receive, from the fuel blend analyzer, a measurement indicative of a composition of the fuel blend; and adjust at least one of a flow of the first fuel and a flow of the second fuel based on at least one of the combustion signal and the fuel blend measurement.

14. The system according to any preceding clause, wherein the fuel blend analyzer comprises a specific gravity sensor or a density meter.

15. The system according to any preceding clause, wherein the first fuel is natural gas and the second fuel is hydrogen.

16. The system according to any preceding clause, wherein the first fuel is liquefied petroleum gas and the second fuel is hydrogen.

17. The system according to any preceding clause, further comprising a sensor communicatively coupled to the controller, the sensor selected from the group consisting of an exhaust gas emissions sensor, an exhaust gas temperature sensor, a combustion pressure sensor, a fuel blend flow sensor, a first fuel flow sensor, a second fuel flow sensor, a first fuel composition sensor, a second fuel composition sensor, and an optical flame sensor.

18. The system according to any preceding clause, wherein the sensor is an optical flame sensor.

19. The system according to any preceding clause, wherein the sensor is a first fuel composition sensor or a second fuel composition sensor.

20. The system according to any preceding clause, wherein the combustor is a staged combustor comprising a first stage and a second stage.

21. The system according to any preceding clause, wherein a first portion of the first fuel is supplied to the first stage, and a second portion of the first fuel is supplied to the mixer for use in mixing the second portion of the first fuel and the second fuel together to obtain the fuel blend.

22. The system according to any preceding clause, wherein the staged combustor is an axially-staged combustor.

23. The system according to any preceding clause, wherein the first fuel is a hydrocarbon gas fuel and the second fuel is a liquefied hydrocarbon fuel.

24. The system according to any preceding clause, wherein the hydrocarbon gas fuel is natural gas and the liquefied hydrocarbon fuel comprises liquefied petroleum gas or pentane.

The methods and systems described herein are not limited to the specific embodiments described herein. For example, components of each system and/or steps of each method may be utilized independently and separately from other components and/or steps described herein. For example, the method and systems may also be used in combination with other turbine systems, and are not limited to practice only with the gas turbine engines as described herein. Rather, the exemplary embodiment can be implemented and utilized in connection with many other turbine applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of controlling a fuel blend for a turbine engine, said method comprising:
supplying a first fuel and a second fuel to a mixer;

mixing, in the mixer, the first and second fuels together to obtain the fuel blend;
receiving, from a fuel blend analyzer downstream from the mixer, a measurement indicative of a composition of the fuel blend;
comparing, by a controller, the fuel blend measurement to an operational model of a combustor;
determining, based on the comparison, predicted combustion conditions in the combustor associated with the fuel blend measurement;
controlling, based on the predicted combustion conditions, at least one of the flow of the first fuel and the flow of the second fuel;
combusting the fuel blend in the combustor;
receiving, from sensors coupled to the combustor, the sensors including a knock sensor and at least one of an optical sensor, a temperature sensor, and a pressure sensor, combustion signals indicative of combustion behavior in the combustor;
comparing, by the controller, the predicted combustion conditions to the combustion signals;
determining, by the controller, whether the predicted combustion conditions match the combustion behavior indicated by the combustion signals; and
updating the operational model if the predicted combustion conditions do not match the indicated combustion behavior.

2. The method according to claim 1, wherein controlling, based on the predicted combustion conditions, by the controller, comprises transmitting, by the controller, an output signal to at least one control valve upstream from the mixer.

3. The method according to claim 1, further comprising:
receiving, from at least one fuel sensor upstream from the mixer, at least one measurement indicative of a composition of at least one of the first fuel and the second fuel;
determining, based on the fuel blend measurement and the at least one measurement of at least one of the first fuel and second fuel, by the controller, the composition of the fuel blend;
comparing, by the controller, the determined composition of the fuel blend to the operational model of the combustor; and
determining, based on the comparison of the determined composition of the fuel blend to the operational model of the combustor, the predicted combustion conditions.

4. The method according to claim 1, further comprising:
comparing, by the controller, the fuel blend measurement to an emissions model of the combustor;
determining, based on the comparison of the fuel blend measurement to the emissions model of the combustor, by the controller, a predicted level of pollutants associated with the fuel blend measurement; and
controlling, based on the predicted level of pollutants, by the controller, at least one of the flow of the first fuel and the flow of the second fuel.

5. The method according to claim 4, further comprising:
receiving, from an emissions sensor downstream from the combustor, an emissions level measurement;
comparing, by the controller, the predicted level of pollutants to the emissions level measurement;
determining, by the controller, whether the predicted level of pollutants matches the emissions level measurement; and
updating the emissions level model if the predicted level of pollutants does not match the emissions level measurement.

6. The method according to claim 1, wherein the first fuel is natural gas and the second fuel is hydrogen.

7. The method according to claim 1, wherein the first fuel is liquefied petroleum gas and the second fuel is hydrogen.

8. The method according to claim 1, wherein the first fuel is a hydrocarbon gas fuel and the second fuel is a liquefied hydrocarbon fuel.

9. The method according to claim 8, further comprising vaporizing the liquefied hydrocarbon fuel prior to supplying the liquefied hydrocarbon fuel to the mixer.

* * * * *